United States Patent [19]

Porat et al.

[11] Patent Number: 5,088,994
[45] Date of Patent: Feb. 18, 1992

[54] DRIP-FEED BAG AND METHOD FOR MANUFACTURING SAME

[76] Inventors: Michael Porat, 52 Hamitnadev Street, Tel Aviv, Israel; Amir Porat, 18 Highland Dr., North Coldwell, N.J. 07006

[21] Appl. No.: 436,716

[22] Filed: Nov. 15, 1989

[30] Foreign Application Priority Data

Nov. 16, 1988 [IL] Israel ......................... 88399

[51] Int. Cl.⁵ ............................................. A61M 5/00
[52] U.S. Cl. ................................. 604/408; 604/403; 604/409; 604/410
[58] Field of Search ............... 604/403, 408, 409, 410

[56] References Cited

U.S. PATENT DOCUMENTS

| | | | |
|---|---|---|---|
| 2,429,869 | 10/1947 | Crowley | 604/408 |
| 4,131,200 | 12/1978 | Rinfret | 604/410 X |
| 4,327,726 | 5/1982 | Kwong et al. | 604/408 X |
| 4,516,977 | 5/1985 | Herber | 604/403 X |
| 4,650,452 | 3/1987 | Jensen | 604/408 X |
| 4,814,231 | 3/1989 | Onohara et al. | 604/408 X |
| 4,854,737 | 8/1989 | Steer et al. | 604/408 X |

*Primary Examiner*—Robert A. Hafer
*Assistant Examiner*—Kerry Owens
*Attorney, Agent, or Firm*—Dennison, Meserole, Pollack & Scheiner

[57] ABSTRACT

A medical drip-feed bag for dispensing fluids made of polyolefin polymer having flexible walls defining therein a collapsible space for storing said fluids, said bag comprising a sealable inlet for introducing fluids into the bag and an outlet for dispensing said fluid, said outlet comprising hermetically sealed connector means sandwiched between said walls, the connector means comprising a substantially lenticularly shaped body with integral nipple, said connector means further comprising a bore going through the body and nipple and forming a channel for fluid to flow out of the bag.

17 Claims, 2 Drawing Sheets

DRIP-FEED BAG AND METHOD FOR MANUFACTURING SAME

The present invention relates to medical drip-feed bags for dispensing fluids and to a method of manufacturing such bags. More specifically, the invention relates to drip-feed bags made from polyolefin polymers such as polyethylene and polypropylene or copolymers thereof, or laminates of these with other plastic materials.

Drip-feed bags generally comprise a plastic bag having two openings at opposite ends, one opening, an inlet, for introducing fluids into the bag and the other opening, an outlet, for dispensing fluid from the bag. The region near the outlet usually is funnel shaped to permit complete drainage of the fluid from the bag via the outlet. The outlet generally comprises an integrally attached length of tubing which is sealed into the bottom of the bag and the terminal end of the tubing is also sealed. The inlet of the bag can also be sealed, thus making the bag hermetically sealable once fluid has been introduced therein.

Such drip-feed bags must of course be sterilizable.

One method of using a filled drip-feed bag to dispense fluids is by cutting the seal of the attached tubing near its terminal end and connecting the tubing with known adaptors for dispensing the fluid either directly or indirectly.

Another method is to pre-attach the tubing and adapter to the bag, additionally closing the tubing with a clamp. When the bag is to be attached to a catheter, the terminal tube cover is removed and the tubing connected to the catheter. Finally, the clamp is released permitting the fluid to flow out through the tubing.

At present, the drip-feed bags are made almost exclusively from polyvinyl chloride (PVC). PVC has a number of properties which favor its use for such bags. First of all, PVC has high strength and durability. It is flexible, which is important for draining the bags, since they can collapse or fold up as the volume of fluid decreases while it is being dispensed. Furthermore, PVC is sterilizable and transparent, so that one can see into the bag. It is printable, so contents and instructions can be printed right on the bag.

These bags are generally manufactured in several consecutive steps. First, two sheets of PVC are placed one on top of the other and the periphery of the bag is shaped by high frequency welding, leaving only the two openings, the inlet and outlet. To the inlet is welded a rigid or semi-rigid collar with a sealable cover. To the outlet, a length of PVC tubing is integrally attached, also by high frequency welding. After introduction of fluid into the bag, the inlet and terminal end of the length of tubing are sealed and it can be sterilized.

These PVC drip-feed bags are quite satisfactory from a functional point of view, but do, however, have some drawbacks. PVC is sensitive to sudden temperature changes, especially when refrigerated. The biggest drawback, however, is the high cost of the bags. This is due to a number of factors. PVC is a relatively heavy polymer, i.e. its density is relatively high, yielding a low volume or sheet area per weight of polymer. Polyolefins such as polyethylene and polypropylene have a much lower density and therefore more bags can be manufactured from polyolefins than from PVC for the same weight of polymer. Furthermore, in order to provide the required strength to the bag, relatively thick gauge PVC sheeting must be used in the manufacture of the bags, adding to the cost. PVC bags are also relatively expensive due to the need to weld them by high frequency welding, which is an expensive and relatively slow process compared to heat sealing which is possible with polyolefins. PVC has another inherent deficiency, namely, it gives off toxic fumes (chloride) during welding and when its physical state changes.

Another factor responsible for increasing the cost of manufacturing PVC drip-feed bags is the slow process of high frequency welding of the PVC tubing to the bag. Alternate methods for attaching the tubing to the bag, such as glueing, are impractical because the glues give off unpleasant or addictive odors. Furthermore, those permitted for use in medical applications are more expensive than the PVC polymer itself and would thus increase the cost of the bag even more, as well as being technically very complicated to use.

Heat welding the tubing to the bag is impossible, because the orifice in the tubing would be sealed in this process because of the heat and pressure exerted thereon by this process. It would be a significant advantage to be able to make drip-feed bags from polyolefins which are cheaper. Polyolefins, such as polyethylene and polypropylene and copolymers thereof, have many of the properties of PVC such as flexibility, transparency, sterilizability, strength, durability and printability. Polyolefins are indeed being used more and more for medical applications. A further advantage would be if one were able to manufacture drip-feed bags more rapidly and economically than is presently possible with PVC bags. Polyolefins, however, have not been used for making drip-feed bags. The reason for this is primarily due to the fact that the drip-feed bag outlet must be connected to a length of tubing in a permanent manner so that, under normal use, pulling at the tubing will not cause it to come off the bag. Since PVC is the exclusive material accepted for tubing and accessories in the drip-feed system, there exists the technical problem of connecting such PVC tubing permanently to the polyolefin bag. This is problematic because polyolefins and PVC are not compatible polymers. These polymers cannot normally be glued together except with very expensive glues which have not yet been approved for medical use. Nor can these polymers be heat sealed together, and even if they could be heat sealed, there remains the problem of the tubing orifice which is liable to be sealed during the heat sealing process.

SUMMARY OF THE INVENTION

It is thus the object of the present invention to provide a polyolefin drip-feed bag.

It is a further object of the invention to provide an inexpensive polyolefin drip-feed bag integrally connected to a length of PVC tubing.

Yet a further object is to provide a method of manufacturing a polyolefin drip-feed bag.

These and further objects are attained by the present invention which consists of a medical drip-feed bag for dispensing fluids made of polyolefin polymer having flexible walls defining therein a collapsible space for storing said fluids, said bag comprising a sealable inlet for introducing fluids into the bag and an outlet for dispensing said fluid, said outlet comprising hermetically sealed connector means sandwiched between said walls, the connector means comprising a substantially lenticularly shaped body with integral nipple, said connector means further comprising a bore going through the body and nipple and forming a channel for fluid to flow out of the bag.

Another object of this invention is to provide a drip-feed bag as stated above together with PVC tubing permanently attached to the bag.

According to a preferred embodiment of the invention, the drip-feed bag is funnel shaped near its outlet to ensure complete drainage of the contents of the bag. In another preferred embodiment of the invention, the nipple has a serrated outer surface, which enables it to be more permanently inserted into the PVC tubing.

It is also an object of this invention to provide a method for manufacturing such drip-feed bags from polyolefin polymers. This method comprises preparing a bag from polyolefin polymers with an inlet and an outlet, wherein the inlet is of a conventional type and the outlet comprises connector means, heat sealed hermetically and sandwiched in between the walls of the bag, said connector means having a substantially lenticularly shaped body with integral nipple and a throughgoing bore through the body and nipple for channelling fluids out of the bag.

It is also an object of the invention to provide a method for permanently attaching PVC tubing to the nipple of the drip-feed bag. One such method involves first dipping the nipple into a PVC solvent, which is not a solvent for polyolefin (from which the connector is made), and forcing the nipple into the PVC tube by known means, whereby the solvent on the nipple comes in contact with and softens the internal surface of the PVC tubing and fashions it to conform to the shape of the serrated outer surface of the nipple, and whereupon drying of the solvent hardens the PVC tubing to become permanently attached to the bag.

Another method for permanently adhering the PVC tubing to the nipple is by using pressure rings.

BRIEF DESCRIPTION OF THE DRAWINGS

The present invention will be further understood and appreciated from the following detailed description taken in conjunction with the drawings in which.

DETAILED DESCRIPTION OF THE INVENTION

Figure 1:
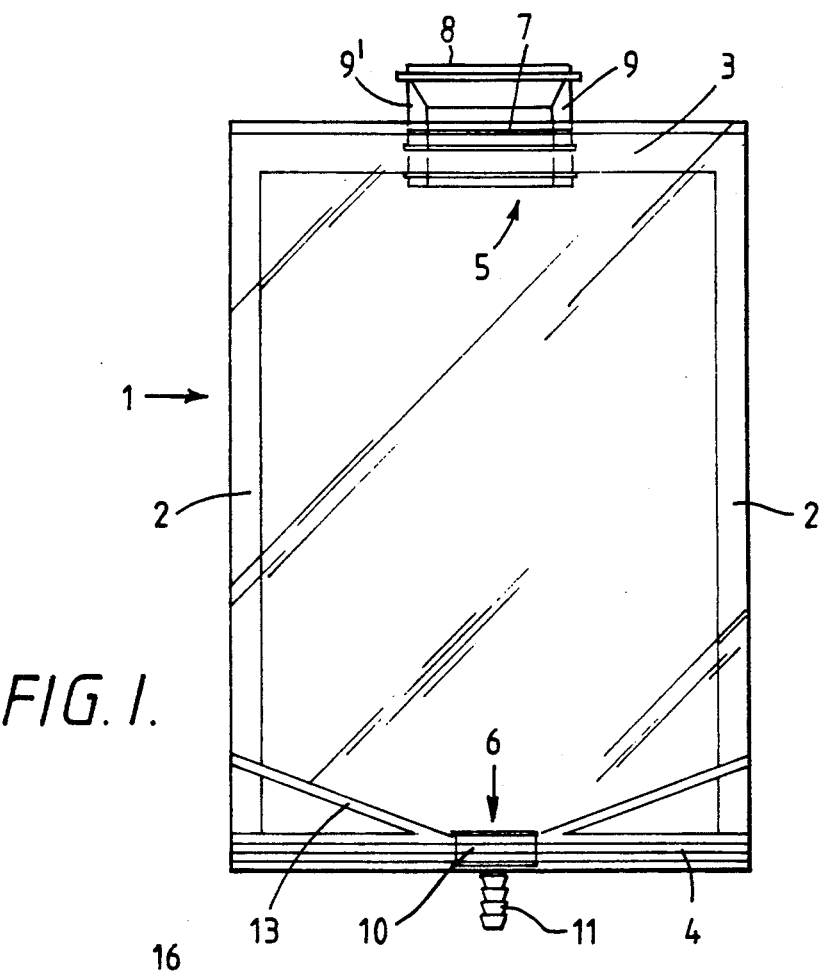
FIG. 1 is a schematic view of a drip-feed bag according to the invention.

Turning now to FIG. 1, this illustrates a drip-feed bag 1 according to the invention made from two sheets polyolefin plastic heat welded together on their sides 2, top 3 and bottom 4, having an inlet 5 and outlet 6. The inlet 5 comprises a collar 7 with closure 8, which is heat welded between the walls of the bag at its upper end 3. This welded cap is hermetically sealed to the bag because its fin flanges 9 and 9' enable complete welding without leaving voids.

The bottom of the bag has an outlet 6 comprising a connector 10 with integrally attached nipple 11. Connector 10 is formed of the same polyolefin plastic material as the inner surface of the walls of the bag, and is preferably injection molded. This connector 10 has a bore 12 going through from its top through the nipple 11 to allow fluids from the bag to exit via the nipple 11. The nipple's outer surface is serrated. The bottom of the bag 1 is heat welded to provide a funnel shaped bottom 13 which directs fluids in the bag to be channelled towards the bore 12 of the connector means 10.

Figures 2, 4:
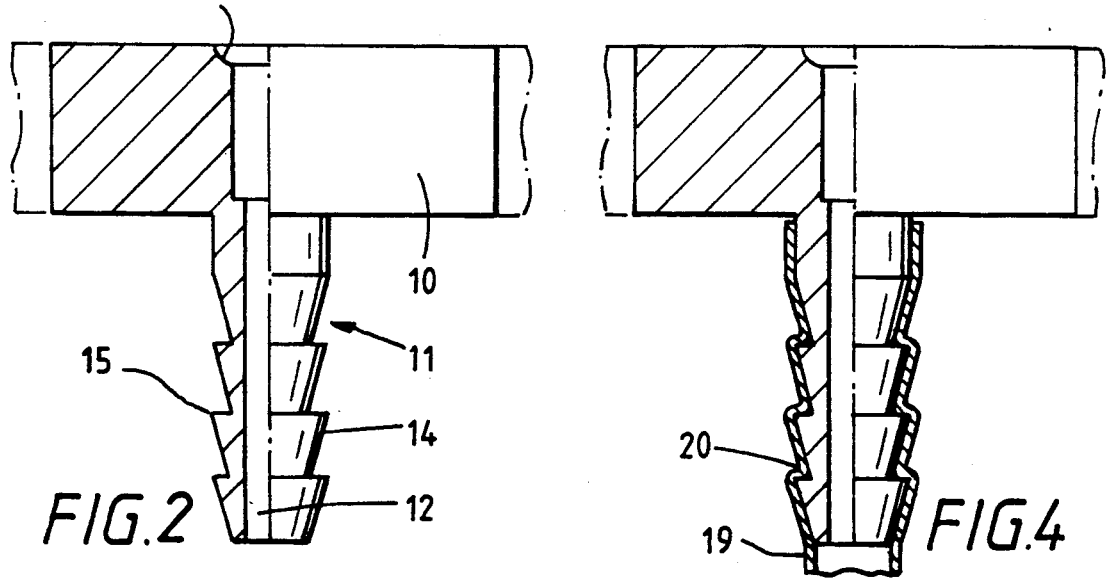
FIG. 2 is a sectional view of one embodiment of the outlet connector of the drip-feed bag.
FIG. 4 is a sectional view of the connector in FIG. 2, when permanently attached to PVC tubing.

FIG. 2 is an enlarged cross-sectional view of one embodiment of the connector means which shows the body of the connector 10 and the integrally connected nipple 11 with throughgoing bore 12. The nipple 11, as can be seen, has a serrated or ratched outer surface 14 with sharp upper edges 15. The purpose of these sharp edges 15 will be explained further on. The inlet 16 of the connector means is somewhat recessed, in order to direct the last bit of fluid from the bag towards the bore 12.

Figure 3:
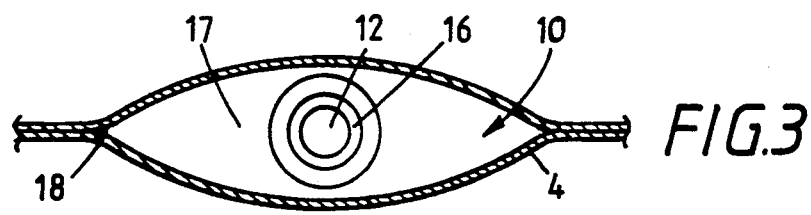
FIG. 3 is a top view of the connector shown in FIG. 2.

FIG. 3 is a top view of the connector means of FIG. 2, showing the lenticularly shaped body 17 tapering to a thin edge 18 at its ends. In the center of the body is the throughgoing bore 12 with saucer shape indentation 16 and nipple 11. The connector is shown welded to the bottom wall of the bag.

As has been stated previously, the connector means is made of a material compatible with the inner wall of the bag, i.e. both the bag and the connector means are made from polyolefins and are heat sealable together. It is the shape of the body 10 of the connector means which permits the walls of the bag to be heat sealed around the perimeter of the body 10. The fact that the section of the body 17 surrounding the bore 12 has substantial thickness and thus is resistant to pressure, enables the bottom 4 walls of the bag to be heat sealed to the body 10 on both sides without crushing or sealing bore 12. It is this tapering lenticular configuration of the body of the connector means which enables complete heat welding of the connector means to the walls of the bag under pressure, so that no leakage occurs.

Figure 5:
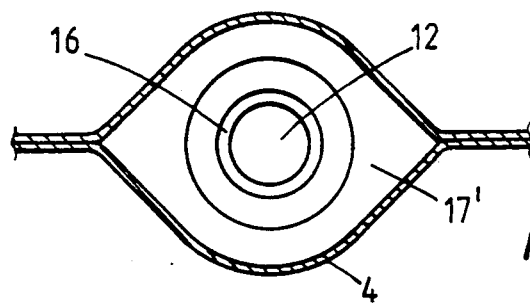
FIG. 5 is a top view of an alternate embodiment of the outlet connector of the drip-feed bag.

According to an alternate embodiment of the invention, shown in FIG. 5, the substantially lenticular body of the connector means may define a partially prism-shaped cross-section (i.e., having planar side edges rather than a completely smoothly curved perimeter). This shape also permits complete heat welding to the bag walls.

We have referred to these drip-feed bags as being made from polyolefin polymers, i.e. polyethylene, polypropylene or copolymers thereof. These bags can, however, also be made from laminates of these polyolefins with other polymers such as nylon or polyester. Such laminates provide additional advantageous properties in that the bags can be made with thinner walls and are stronger than those made from polyolefin alone. The laminates also give more transparent bags. When using such laminated materials for making the bags, it is important that the polyethylene layer be on the inside of the bag, so that the connector means can be readily heat welded and sandwiched between the bag walls because of the compatibility of the polyolefin connector means with the inner polyolefin layer of the bag.

In order to permanently attach PVC tubing to the nipple of the connector, so that ordinary pulling of the tubing will not sever it from the bag, one might think it sufficient to take flexible PVC tubing having an internal diameter slightly smaller than the outer diameter of the nipple, warm it to expand the diameter slightly and push the tubing over the nipple. This, however, has proven to be inadequate to hold the tubing permanently attached to the nipple, since upon strong pulling the tubing can be separated from the bag, especially upon ageing of the tubing. It is therefore preferable to use the following procedure: before pushing the nipple into the tubing, it is dipped into a known PVC solvent, such as tetrohydrofuran, cyclohexanone, dimethylformamide, etc. The nipple 11 is then inserted into the PVC tubing (see FIG. 4). The PVC solvent does not affect the nipple, which is made from polyolefin polymer, however it does soften and partially dissolve the interior wall of the PVC tubing 19, which takes on the shape of the serrated outer surface of the nipple. As the solvent dries, the PVC hardens and forms a tight mating fit 20 around the nipple 11 with edges 15 sticking into the PVC, strong enough to prevent pulling the tubing away from the bag.

An alternate way of connecting the PVC tubing to the nipple is by using pressure rings which forceably hold the tubing to the nipple under pressure. Such pressure rings are known in the art and can be either of the ratchet type or of the heat shrink type used in the electronics field. In this latter method a ring is inserted over the tubing and nipple and then heated to cause it to shrink and harden, thereby forming a tight and permanent grip between the tube and nipple. From a cost effective point of view the solvent method of attaching the tubing to the nipple appears to be more economical.

The inventive method of preparing drip-feed bags uses inexpensive and rapid heat welding techniques and avoids use of costly and slow high frequency welding. Therefore, the bags can be manufactured at a much faster rate and at lower cost.

It is of course understood that it is possible to manufacture the bag with additional accessories, such as means for hanging the bag upright to help drain out all the fluid. The processes for doing so are all well known in the art.

Figure 6A:
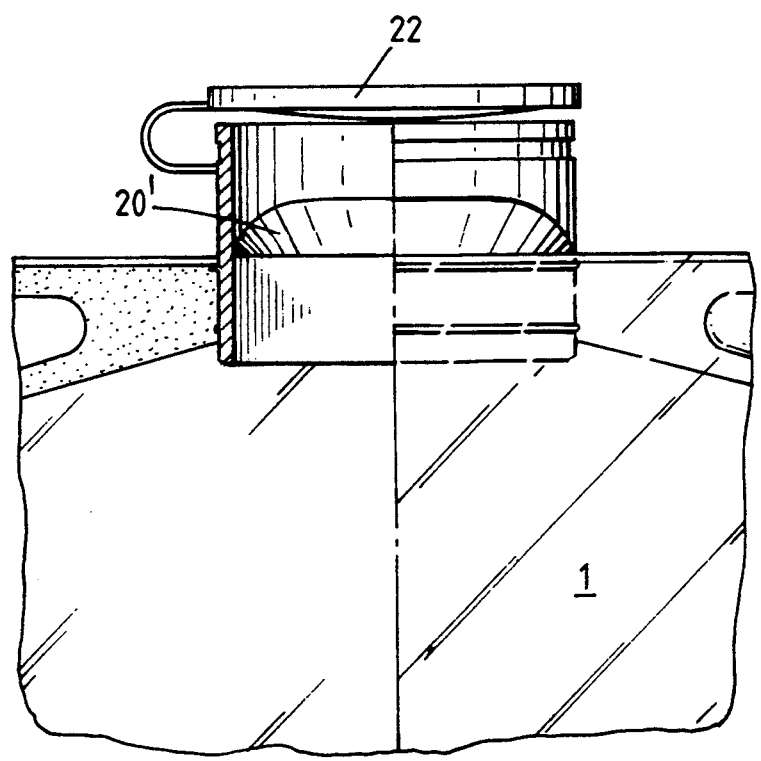
FIGS. 6a and 6b are respective side and sectional views of an alternate closure means for the drip-feed bags of the present invention.
Figure 6B:
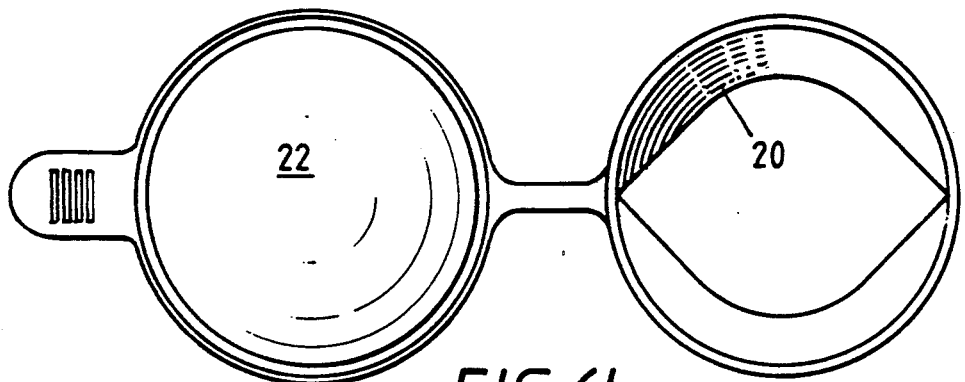

Referring now to FIGS. 6a and 6b there is shown a closure means 8 according to an alternate embodiment of the invention for use with enteral feed bags. This closure includes a neck 20 and cover 22. Neck 20 defines a curved or prismatic lenticular shape, similar to that of connector means 10. This closure means 8 is made of a material compatible with the inner wall of the bag, i.e. both the bag and the closure means are made from polyolefins and are heat sealable together. Preferably, the closure means is injection molded. It is the substantially lenticular shape of the neck 20 of this closure means which ensures that the walls of the bag are heat sealed around the perimeter of the neck 20. As with the connector, the section of the neck surrounding the inlet has substantial thickness and thus is resistant to pressure, enabling the top walls of the bag to be heat sealed to the closure on both sides without crushing or sealing the inlet.

We claim:

1. A medical drip-feed bag for dispensing fluids made of polyolefin polymer having flexible walls defining therein a collapsible space for storing said fluids, said bag comprising a sealable inlet for introducing fluids into the bag and an outlet for dispensing said fluids, said outlet comprising hermetically sealed connector means sandwiched between said walls, said connector means comprising a substantially lenticularly shaped body with integral nipple, said connector means further comprising a bore going through the body and nipple and forming a channel for fluid to flow out of the bag, said connector means consisting essentially of a polyolefin polymer and being heat sealed directly to said walls without an intermediate adhesive layer therebetween.

2. A medical drip-feed bag as in claim 1 wherein the nipple has a serrated outer surface.

3. A medical drip-feed bag as in claim 1 further comprising PVC tubing permanently attached to the outlet of the bag.

4. A medical drip-feed bag as in claim 1 made from polyethylene, polypropylene or copolymers thereof.

5. A medical drip-feed bag as in claim 1 made from a laminate of a polyolefin and another polymer.

6. A medical drip-feed bag as in claim 5 wherein the other polymer is selected from nylon and polyester.

7. A medical drip-feed bag as in claim 1 wherein the substantially lenticularly shaped body defines a smooth curve.

8. A medical drip-feed bag as in claim 1 wherein the substantially lenticularly shaped body defines a prismatic cross-section.

9. A medical drip-feed bag as in claim 1 wherein said inlet comprises hermetically sealed closure means sandwiched between said walls, said closure means comprising a substantially lenticularly shaped neck and a cover.

10. A medical drip-feed bag as in claim 9 wherein the substantially lenticularly shaped body defines a smooth curve.

11. A medical drip-feed bag as in claim 9 wherein the substantially lenticularly shaped body defines a prismatic cross-section.

12. A medical drip-feed bag as in claim 3 wherein said PVC tubing is attached to said outlet by said adhesive means comprising a solvent for PVC which softens the tubing but does not affect the outlet.

13. A method for manufacturing drip-feed bags from polyolefin comprising the steps of:
    preparing a bag from polyolefin polymer, said bag having an inlet and an outlet for fluids; and
    directly heat sealing a connector means consisting essentially of polyolefin having a substantially lenticularly shaped body with integral nipple and a central throughgoing bore through the body and nipple in said outlet, while the connector means is sandwiched in between the walls of the bag, without an intermediate adhesive layer between the walls and the connector.

14. A method for manufacturing drip-feed bags according to claim 13 and further comprising the steps of:
    heat sealing a closure means having a substantially lenticularly shaped body with a central throughgoing bore in said inlet, while the closure means is sandwiched in between the walls of the bag.

15. A method as in claim 13 wherein said nipple is formed with a serrated outer surface and further comprising permanently affixing a length of PVC tubing to said nipple.

16. A method according to claim 15 and wherein said step of permanently affixing comprises dipping the nipple into a PVC solvent, then forcing the PVC tubing onto the nipple and allowing the solvent to dry, thereby conforming the inner surface of the tubing to the shape of the nipple.

17. A method in accordance with claim 15 wherein said step of permanently affixing comprises forcing a length of PVC tubing onto the nipple and retaining it thereon by pressure rings.

* * * * *